(12) United States Patent  
Dagesse et al.

(10) Patent No.: US 10,107,442 B2  
(45) Date of Patent: Oct. 23, 2018

(54) ENCAPSULATION SYSTEM AND KIT FOR A LENGTH OF PIPE DISPOSED UNDERGROUND

(71) Applicant: Platinum Insulating Services Ltd., Grande Prairie (CA)

(72) Inventors: Paul Dagesse, Clairmont (CA); Pat Minamide, Grande Prairie (CA); Mike Dagleish, Grande Prairie (CA)

(73) Assignee: Platinum Insulating Services Ltd., Grande Prairie, CA (US)

( * ) Notice: Subject to any disclaimer, the term of this patent is extended or adjusted under 35 U.S.C. 154(b) by 378 days.

(21) Appl. No.: 14/928,160

(22) Filed: Oct. 30, 2015

(65) Prior Publication Data

US 2017/0122487 A1 May 4, 2017

(51) Int. Cl.
| | |
|---|---|
| *F16L 11/00* | (2006.01) |
| *F16L 57/06* | (2006.01) |
| *B29C 63/00* | (2006.01) |
| *F16L 9/19* | (2006.01) |
| *B29C 63/22* | (2006.01) |
| *B29K 75/00* | (2006.01) |
| *B29K 105/04* | (2006.01) |
| *B29L 23/00* | (2006.01) |

(52) U.S. Cl.
CPC .......... *F16L 57/06* (2013.01); *B29C 63/0017* (2013.01); *B29C 63/22* (2013.01); *F16L 9/20* (2013.01); *B29K 2075/00* (2013.01); *B29K 2105/04* (2013.01); *B29K 2995/0015* (2013.01); *B29L 2023/22* (2013.01); *B29L 2023/225* (2013.01)

(58) Field of Classification Search
CPC ..................................... F16L 9/20; F16L 57/06
USPC ........................................ 138/110, 149, 158
See application file for complete search history.

(56) References Cited

U.S. PATENT DOCUMENTS

| | | | | |
|---|---|---|---|---|
| 1,874,369 A | * | 8/1932 | Shoemaker ............ | H02G 9/065 138/110 |
| 2,773,512 A | * | 12/1956 | Burk ....................... | F16L 59/15 138/113 |
| 3,556,158 A | * | 1/1971 | Schneider ............... | F16K 27/12 137/375 |
| 3,995,846 A | * | 12/1976 | Frick ..................... | A61F 15/005 5/646 |
| 4,073,317 A | * | 2/1978 | Ellis ....................... | F16L 3/137 138/147 |

(Continued)

*Primary Examiner* — James Hook  
(74) *Attorney, Agent, or Firm* — Adrian D. Battison; Ade + Company Inc.; Ryan W. Dupuis

(57) ABSTRACT

A kit for encapsulating a length of pipe features first and second foam sections cooperatively shaped to form a cavity with open ends in a working configuration of the foam sections for receiving the length of pipe therein. A low density foam, which is lower in density than the material of the foam sections, fills an unoccupied space in the cavity so as to provide cushioning for the length of pipe such that movement of the length of pipe within the cavity is permitted and stress on the length of pipe is reduced. The foam sections may be reinforced with reinforcing membranes carried in a main body of the respective foam section. The reinforcing membranes may act to hold the foam material of the respective section together and to prevent puncture along a full thickness of the foam sections from abrasive debris in the ground.

17 Claims, 8 Drawing Sheets

(56) References Cited

U.S. PATENT DOCUMENTS

| | | | | |
|---|---|---|---|---|
| 4,275,771 | A * | 6/1981 | Campbell, Jr. | F27D 3/022 |
| | | | | 138/111 |
| 4,276,332 | A * | 6/1981 | Castle | A62C 3/16 |
| | | | | 138/149 |
| 4,438,785 | A * | 3/1984 | Morrison | H02G 9/065 |
| | | | | 138/103 |
| 4,642,253 | A * | 2/1987 | Ruoff-Schafer | F16L 59/135 |
| | | | | 138/105 |
| 6,000,438 | A * | 12/1999 | Ohrn | E21B 17/01 |
| | | | | 138/149 |
| 2006/0054235 | A1 * | 3/2006 | Cohen | B32B 15/08 |
| | | | | 138/149 |
| 2007/0102055 | A1 * | 5/2007 | Blair | F16L 59/02 |
| | | | | 138/114 |
| 2017/0122488 | A1 * | 5/2017 | Dagesse | F16L 57/06 |

* cited by examiner ered which may be caused by this pipe movement within the
ENCAPSULATION SYSTEM AND KIT FOR A LENGTH OF PIPE DISPOSED UNDERGROUND

FIELD OF THE INVENTION

The present invention relates generally to underground piping such as pipelines carrying one of oil and gas, and more particularly to arrangements for protecting underground piping such as from abrasive contents in the ground and traffic impact.

BACKGROUND

Underground piping is employed to carry fluids across significant distances. In the oil and gas industry, pipelines are significant investments intended to be operable for long after their installation. Furthermore, the oil or gas carried by these pipelines presents substantial environmental risks and lost revenues in the event that the pipeline ruptures. For example, rupture may occur due to stress exerted on the pipeline by abrasive contents in the ground, such as rocks, as the piping moves in the ground due to thermal expansion and contraction. The abrasive contents form pressure points externally on the piping which may eventually cause rupture.

Thus, it is desirable to provide a unique solution for protecting pipelines installed in the ground.

SUMMARY OF THE INVENTION

According to one aspect of the invention there is provided a kit for encapsulating a length of pipe which is disposable underground in a subterranean environment and has a prespecified diameter, the kit comprising:

elongate first and second foam sections extending in a longitudinal axis along the length of pipe that are shaped to cooperatively form a longitudinally elongate cavity with open longitudinal ends in a working configuration of the foam sections for receiving the length of pipe in said cavity so as to enclose the length of pipe around its full circumference thereby shielding the length of pipe, wherein one of the foam sections defines a bottom covering usable for positioning beneath the length of pipe and one of the foam sections defines a top covering usable for positioning over the length of pipe;

a securing arrangement for holding the first and second foam sections in the working configuration;

a volume of low density foam which is less dense than a material of the first and second foam sections for filling unoccupied space in the cavity;

whereby the volume of low density foam provides cushioning for the length of pipe such that movement of the length of pipe within the cavity is permitted and stress on the length of pipe is reduced.

In the embodiment as described in more detail hereinafter, the first and second foam sections provide direct protection from an external environment surrounding the length of pipe such as debris and abrasive articles or contents such as rocks disposed in the ground. A reinforcing membrane lines the cavity so as to provide direct support to the length of pipe residing thereon thereby dissipating stress due to weight of the length of pipe that may be exerted on the foam section that defines the bottom covering. Additional reinforcing membranes are carried at or adjacent outside faces of the foam sections so as to resist deformation, such as puncturing, of the foam sections by contents of the subterranean environment. Additionally, the low density foam provides cushioning for the length of pipe so as to reduce pressure thereon originating from an external source outside the first and second foam sections and transmitted therethrough. Furthermore, the low density foam allows the length of pipe to move within the cavity, such as movement due to thermal expansion and contraction, while resisting formation of pressure on the length of pipe due to the kit or encapsulation system that may be caused by this pipe movement within the cavity. Additionally, the foam material, such as of the foam sections, may be suited for thermally insulating the length of pipe so as to resist frost build up thereon and reduce thermal expansion and contraction of the pipe. Moreover, for example, the encapsulation kit may be suited for protecting the length of pipe against traffic impact—that is, traffic-induced vibration which is transmitted through the ground. The encapsulation kit locates the length of pipe generally in place, although some shifting from this location may be permitted as described above.

In one arrangement, there is provided a reinforcing membrane comprising a material which is more resistant to pressure before incurring permanent shape change than a material of the first and second foam sections. The reinforcing membrane is carried at or adjacent a respective inside face of said one of the foam sections defining the bottom covering thereby lining a portion of the cavity for providing support for the length of pipe.

In one instance, the reinforcing membrane comprises a body of polyethylene plank foam forming a mat located at or adjacent said inside face of said one of the first and second foam sections defining the bottom covering.

In one instance, the reinforcing membrane comprises a body of rubber material forming a mat located at or adjacent said inside face of said one of the first and second foam sections defining the bottom covering.

In one instance, the reinforcing membrane comprises a body of plastic forming a sheet located at or adjacent said inside face of said one of the first and second foam sections defining the bottom covering.

The body of plastic may be embedded in said one of the first and second foam sections defining the bottom covering.

Preferably, an antifriction material is carried by a respective inside face of said one of the foam sections defining the bottom covering. That is, this antifriction material reduces friction between itself and the length of pipe such as that generated by movement of the pipe along or across the antifriction material so that pressure and stress on the length of pipe is reduced. For example, the antifriction material has a low coefficient of at least one of static or kinetic friction, especially with a material of the piping.

In one arrangement, there is provided a reinforcing membrane comprising a material which is more resistant to pressure before incurring permanent shape change than a material of the first and second foam sections, the reinforcing membrane being carried at or adjacent a respective outside face of at least one of the first and second foam sections that is exposable to the subterranean environment.

The reinforcing membrane may be embedded in said at least one of the first and second foam sections in a manner so as to be located at or adjacent the outside face thereof.

The first and second foam sections respectively may comprise a body of insulating foam.

Additionally or alternatively, the low density foam may comprise a volume of insulating foam.

At least one of the first and second foam sections may include a depression in an inside face thereof for locating the length of pipe in the cavity.

According to another aspect of the invention there is provided a combination of a pipe which is disposable underground in a subterranean environment and has a pre-specified diameter and an encapsulation system for preserving said pipe, the combination comprising:

elongate first and second foam sections extending in a longitudinal axis along the pipe that are shaped so as to cooperatively form a longitudinally elongate cavity with open longitudinal ends in a working configuration of the foam sections;

the cavity having a height and a width which are measured transversely to one another and to the longitudinal axis, the height and width of the cavity being sized at least equal to the pre-specified diameter of the pipe;

a length of the pipe received in said cavity formed by the first and second foam sections disposed in the working configuration such that the length of the pipe is enclosed by the first and second foam sections around its full circumference so as to be shielded thereabout;

one of the foam sections defining a bottom covering usable for positioning beneath the length of the pipe and one of the foam sections defining a top covering usable for positioning over the length of the pipe;

a securing arrangement holding the first and second foam sections in the working configuration;

a volume of low density foam which is less dense than a material of the first and second foam sections filling an unoccupied space within the cavity to either side of the length of the pipe so as to cushion the length of the pipe such that movement of the length of the pipe within the cavity is permitted and stress on the length of the pipe is reduced.

In one arrangement, there is provided a reinforcing membrane comprising a material which is more resistant to pressure before incurring permanent shape change than a material of the first and second foam sections that is carried at or adjacent a respective inside face of one of the first and second foam sections defining the bottom covering such that the reinforcing membrane is disposed at or adjacent a circumferential periphery of the length of the pipe. Thus, the reinforcing membrane lines a portion of the cavity so as to provide support for the length of the pipe resting therein.

The width of the cavity may be sized on the order of at least twice the pre-specified diameter of the length of the pipe. Thus, sufficient room may be provided in the cavity for the low density foam to reside therein such that the length of the pipe is adequately cushioned.

Preferably, each of the top and bottom coverings has a predetermined thickness as measured along the height of the cavity that is on the order of the pre-specified diameter of the length of the pipe.

In one arrangement, there is provided at least two of one of the first and second foam sections disposed end-to-end on a common side relative to the circumference of the length of the pipe, a junction between ends of said at least two of said one of the first and second foam sections that are facing each other being filled with the low density foam to afford shifting between said at least two of said one of the first and second foam sections relative to each other.

In one arrangement, the first and second foam sections are offset from each other in a direction along the longitudinal axis so as to present a portion of a respective inside face thereof for overlapping by another one of the opposite one of the first and second foam sections.

According to a further aspect of the invention there is provided a kit for encapsulating a length of pipe which is disposable underground in a subterranean environment and has a pre-specified diameter, the kit comprising:

elongate first and second foam sections extending in a longitudinal axis along the length of pipe and generally L-shaped in transverse cross-section so as to have a long leg and a short leg of each foam section;

the L-shaped foam sections forming a longitudinally elongate cavity with open longitudinal ends and a rectangular cross-section in a working configuration of the first and second foam sections for receiving the length of pipe in said cavity so as to enclose the length of pipe around its full circumference thereby shielding the length of pipe, wherein one of the foam sections defines a bottom covering usable for positioning beneath the length of pipe and one of the foam sections defines a top covering usable for positioning over the length of pipe;

a securing arrangement for holding the first and second foam sections in the working configuration;

a volume of low density foam which is less dense than a material of the first and second foam sections for filling unoccupied space in the cavity;

whereby the volume of low density foam provides cushioning for the length of pipe such that movement of the length of pipe within the cavity is permitted and stress on the length of pipe is reduced.

In one arrangement, there is provided a reinforcing membrane comprising a material which is more resistant to pressure before incurring permanent shape change than a material of the first and second foam sections that is carried at or adjacent a respective inside face of said one of the foam sections defining the bottom covering thereby lining a portion of the cavity for providing support for the length of pipe.

Preferably, the long legs of the first and second foam sections are parallel to a width of the cavity which is measured between the short legs of the first and second foam sections disposed in the working configuration such that the width of the cavity is larger than a height of the cavity which is measured between the long legs of the first and second foam sections.

BRIEF DESCRIPTION OF THE DRAWINGS

Preferred arrangements of the invention will now be described in conjunction with the accompanying drawings in which.

In the drawings like characters of reference indicate corresponding parts in the different figures.

DETAILED DESCRIPTION

Figure 1:
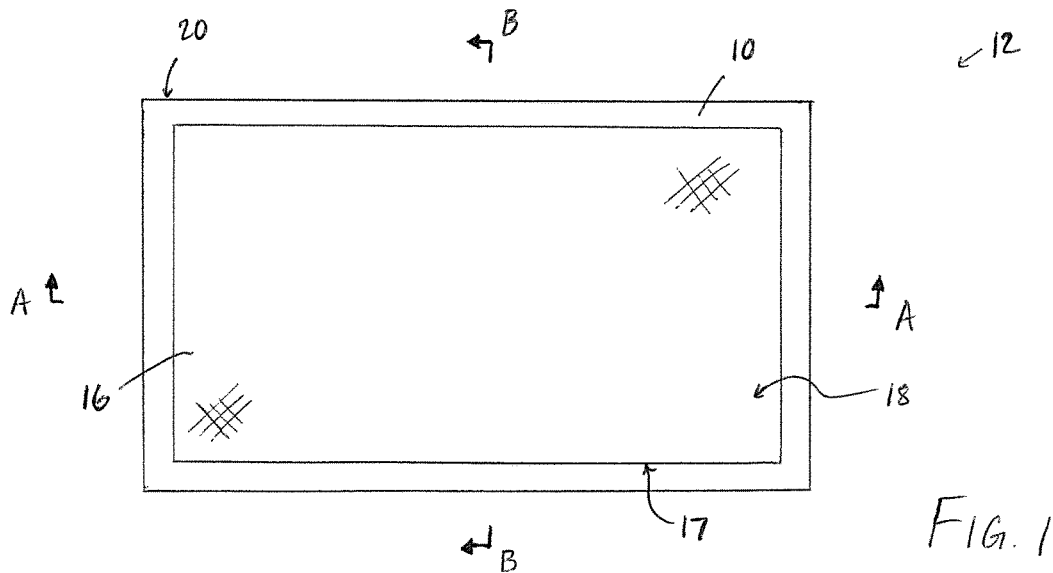
FIG. 1 is a top plan view of a first arrangement of reinforced foam block according to the present invention.

Referring to FIGS. 1 through 10, there are illustrated a number of preferred arrangements of reinforced foam block.

In this description, features which are common to all of the illustrated preferred arrangements are described first. Then, description of features which are unique with respect to the respective preferred arrangement follow thereafter. It will be understood that features which are described particularly with respect to one of the preferred arrangements of reinforced foam block may be combined in an appropriate manner with features specifically described with another one of the preferred arrangements.

The reinforced foam block comprises a body of foam material 10. For example, the foam material may comprise synthetic polymeric foam such as polyurethane foam. In certain applications, it may be preferred that the foam material comprises a thermally insulating foam, of which polyurethane foam is an example as well.

The body of foam material forms a three-dimensional main body 12 which has a volume and at least one peripheral face 14 with a predetermined surface area. That is, reference to 'block' in this specification is intended to not be limiting of shape of the block and includes any 3D shape. For example, the block may be shaped, in three dimensions, as a sphere, cylinder (for example circular cylinder, rectangular cylinder, and triangular cylinder), pyramid, etc. Typically, the main body 12 has a plurality of peripheral faces 14 which may be exposed to an external environment of the foam block, and therefore subject to forces exerted in directions transversely to the surface area of the respective peripheral face 14, such as those schematically indicated by arrows indicated at F1, F2, and F3 in FIG. 3 (which are spaced from the foam block for clarity of illustration). Since the foam material is suited for providing a cushioning effect due to its material properties, such foam blocks are typically subjected to compressive forces.

The reinforced foam block includes at least one body of reinforcing material 16 embedded within the main body 12. The reinforcing material has greater tensile strength than the foam material 10 forming the main body. As such, the reinforcing material 16 may be considered to be 'more resistant to pressure' than the foam material 10 before incurring permanent shape change. That is, in comparison to the foam material, the reinforcing material is less likely to become at least one of broken; penetrated or pierced; or split, divided, or otherwise reduced to fragments as a result of pressure exerted on this material. Pressure can be regarded as force applied per unit area, such that pressure and force are related to one another. Examples of suitable reinforcing material 16 include plastic, rubber, and geotextile. Additionally, the reinforcing material may comprise a permeable material. For example, the permeable material may be porous so as to have a plurality of openings, each of which is formed through a full thickness of the body of reinforcing material. As such, either one of plastic, rubber, and geotextile materials in a suitable form may be considered to be permeable. The reinforcing material may also be flexible so as to be suited for a degree of deformation in shape within the main body in accordance with a general application in which the foam block is provided as a cushion.

In the illustrated arrangements, each body of reinforcing material 16 forms a sheet with a predetermined thickness and a prescribed surface area delimited by a peripheral edge 17. The sheet may be may be polygonal shaped with nonlinear sides such that the sheet is not necessarily rectangular in shape with straight linear sides in alternative arrangements.

Each body of reinforcing material 16 is embedded in the body of foam material 10 so as to be carried by the body of foam material in prescribed position within the main body 12. A respective orientation of the reinforcing material body may vary from one arrangement to another. For example, the reinforcing sheet 16 may be parallel to a proximal peripheral face 14A to which the sheet is located closest, or the reinforcing sheet may be inclined with respect to the closest peripheral face 14A.

Figure 3:
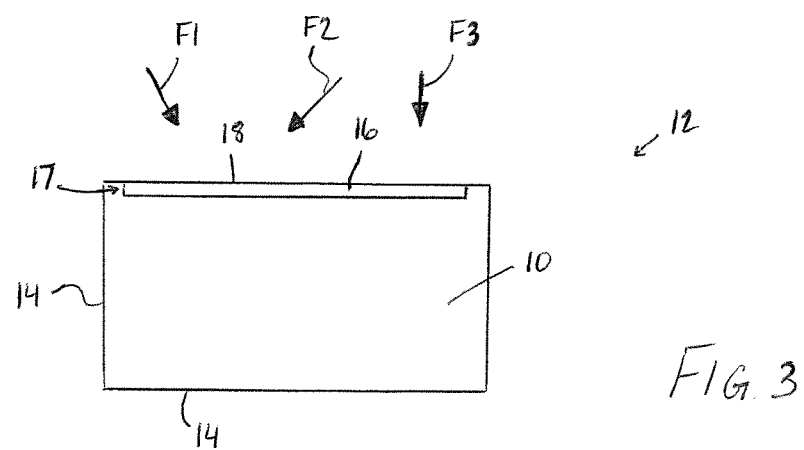
FIG. 3 is a cross-sectional view along line B-B in FIG. 1 showing the first arrangement thereof.

The main body 12 benefits from the provision of each body of reinforcing material in that each reinforcing material body provides strength to the main body against force applied to the main body in a direction transversely with respect to the prescribed surface area of the respective body of reinforcing material, for example as forces F1 through F3 as expressly shown in FIG. 3.

This enhancement in strength of the main body 12, provided by the body of reinforcing material, may be realized in a number of different ways including in a manner such that the reinforcing material acts to hold the foam material together so as to resist splitting or breaking up into smaller fragments under transversely applied forces.

Additionally or alternatively, the strength enhancement of the main body may be realized in a manner such that the body of reinforcing material 16 disperses a transversely applied force which is exerted on the main body, and which may be transmitted through the foam material to the reinforcing material body, over the prescribed surface of the body of reinforcing material. For example, the characteristic described in this paragraph may be attributed, at least to some degree, to material hardness of the reinforcing material—that is, resistance of the material to permanent shape change.

Location of the body of reinforcing material 16 within the main body, in relation to the peripheral faces 14 and peripheral edges 20 of the main body, may vary from one arrangement to another as demonstrated in FIGS. 1 through 10.

In one arrangement, a respective body of reinforcing material 16 is carried at or adjacent the respective peripheral face 14A. Additionally or alternatively, a respective body of reinforcing material 14 is spaced further from the peripheral face 14A so as to be more deeply situated in the main body than at a location at or adjacent the peripheral face, for example at a location approximately midway between diametrically opposite pair of peripheral faces 14A, 14B.

Figure 2:
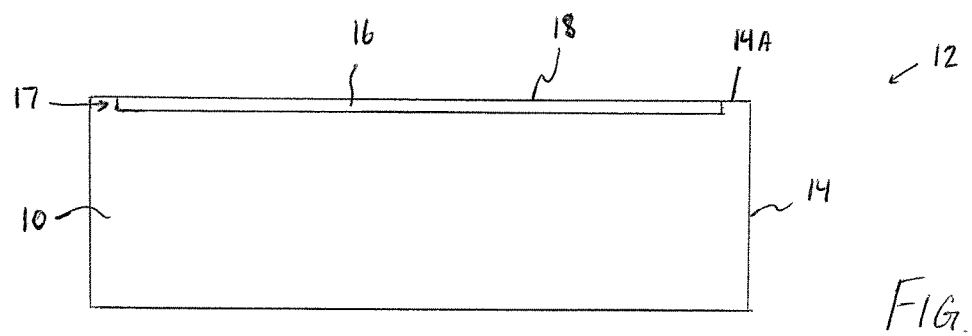
FIG. 2 is a cross-sectional view along line A-A in FIG. 1 showing the first arrangement thereof.

FIGS. 1 through 3 more clearly show a first arrangement of the reinforced foam block. In this first arrangement, the body of foam material 10 comprises a rectangular cylinder or rectangular prism. Furthermore, the body of reinforcing material 16 forms a rectangular sheet with uniform thickness over its entire prescribed surface area. In this illustrated first arrangement, the body of reinforcing material comprises a PVC plastic mesh (as schematically indicated in FIG. 1) such that the material is porous and thus permeable.

In terms of structure, the body of reinforcing material 16 of the first arrangement is located at one of the peripheral faces 14A of the main body so as to define a surface of this particular peripheral face. Therefore, one face 18 of the body of the reinforcing material is wholly uncovered across the face's surface area by any foam material and is thus exposed to an external surrounding environment of the main body. However, the reinforcing material body's peripheral edge 17 is spaced from or recessed from a peripheral edge 20 of the respective peripheral face 14A of the main body at which the reinforcing material body is located so as to be entirely surrounded by a thickness of the foam material disposed about the peripheral edge 17 of the reinforcing material body.

Figure 4:
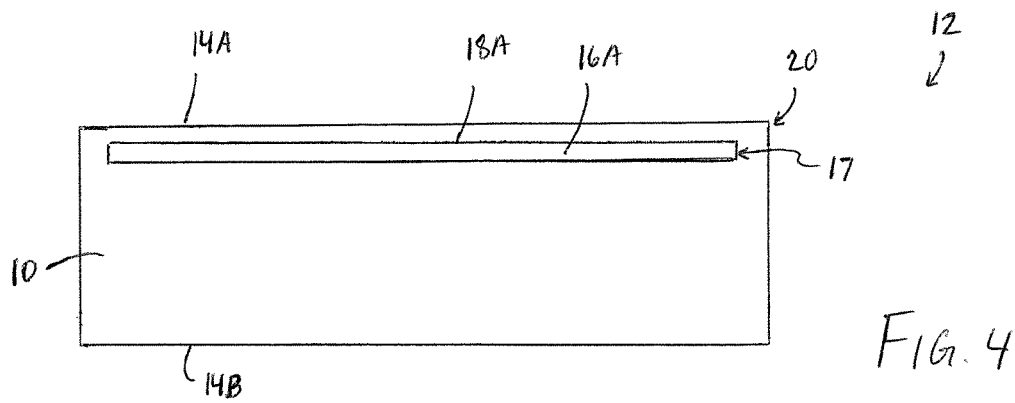
FIG. 4 is a cross-sectional view as if along line A-A but showing a second arrangement of reinforced foam block according to the present invention.

FIG. 4 more clearly illustrates a second arrangement of the reinforced foam block, which includes a single body of reinforcing material 16A located adjacent one of the peripheral faces 14A of the main body 12 but recessed therefrom. Therefore, a thickness of the foam material is disposed over the prescribed surface area of one face 18A of the body of reinforcing material 16A which is oriented parallel to the proximal peripheral face 14A near which the reinforcing material body is disposed. In this illustrated second arrangement, the thickness of the foam material between the proximal peripheral face 14A of the main body and the closest face 18A of the reinforcing sheet body is uniform across the surface area thereof. Furthermore, at least a pair of diametrically opposite edges of the reinforcing body that form the peripheral edge 17 thereof are spaced from the peripheral edge 20 of the proximal peripheral face 14A. In contrast, the remaining pair of opposing edges may be aligned with respective edges of the proximal peripheral face so as to be exposed to the external environment and generally flush with opposing peripheral faces which adjoin the proximal peripheral face, as more clearly shown in FIG. 8, for example. Alternatively, the entire peripheral edge 17 of the reinforcing body may be spaced from the peripheral edge of the proximal peripheral face as more clearly demonstrated in FIG. 1, such that the entirety of the body of reinforcing material is encapsulated in the foam material. Moreover, for example, the body of reinforcing material 16A in this second arrangement may comprise a sheet of stranded rubber, such as that which comprises a plurality of individual rubber strands aggregated in the form of a mat or interwoven in the form of a mat.

In general, whether the body of reinforcing material is fully encapsulated by the body of foam material or whether any portion of the reinforcing material body is exposed so as to be uncovered by foam material, as seen more clearly in FIG. 4 the body of reinforcing material is oriented in the main body in a manner so as to match a contour of the proximal peripheral face 14A of the main body. However, in alternative embodiments, the body of reinforcing material may be misaligned from the contour of the proximal peripheral face.

Figure 5:
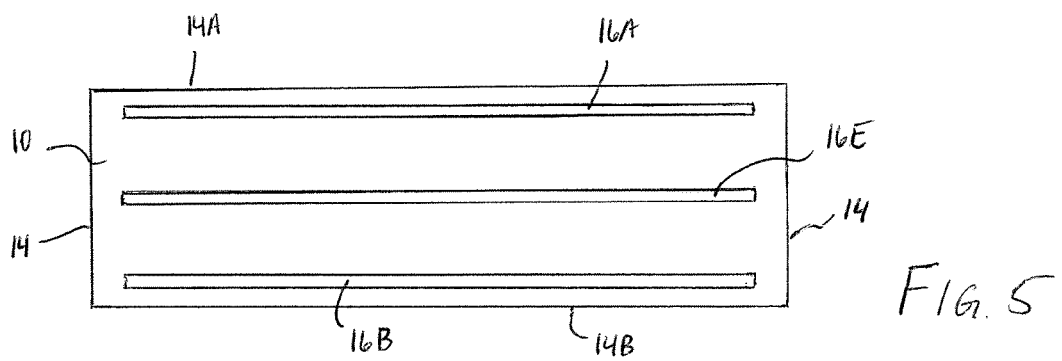
FIG. 5 is a cross-sectional view as if along line A-A but showing a third arrangement of reinforced foam block according to the present invention.

Turning now to FIG. 5, this figure more clearly illustrates a third arrangement of reinforced foam block including a plurality of bodies of reinforcing material 16A, 16B, 16E disposed in a virtually stacked array within the main body 12. More specifically, the reinforcing material bodies 16A, 16B, and 16E are disposed in spaced parallel fashion relative to one another so as to be separated by a thickness of foam material 10 disposed between each pair of adjacent reinforcing material bodies. As such, two outermost ones of the reinforcing bodies 16A and 16B are carried adjacent diametrically opposite peripheral faces 14A and 14B but recessed therefrom, and a third intermediate one of the reinforcing bodies 16E is disposed approximately midway between these opposing peripheral faces. Such a layered arrangement as illustrated may provide redundancy and added strength for an inside center portion of the main body over an arrangement having bodies of reinforcing material carried only at or adjacent the peripheral faces of the main body. Furthermore, in this third arrangement, for example, the reinforcing material may comprise geotextile material.

Figure 6:
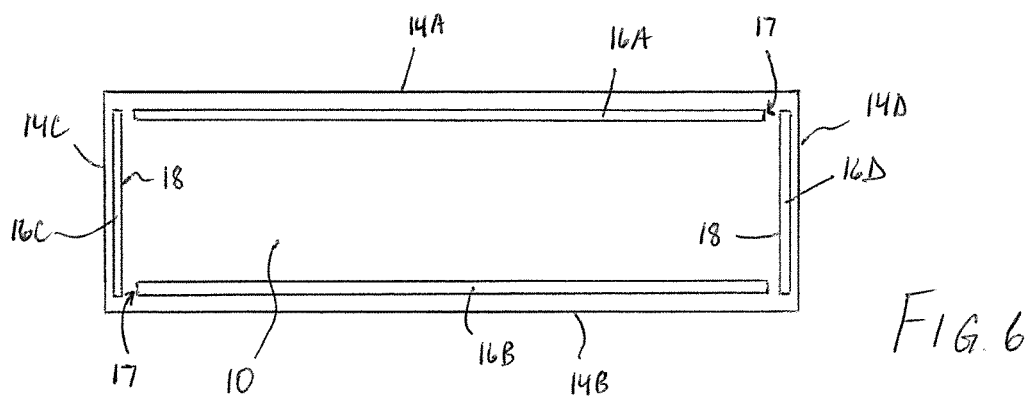
FIG. 6 is a cross-sectional view as if along line A-A but showing a fourth arrangement of reinforced foam block according to the present invention.

In FIG. 6, a fourth arrangement of reinforced foam block is more clearly shown and includes a plurality of bodies of reinforcing material 16A through 16D, each of which is carried at or adjacent one of the plurality of peripheral faces 14A through 14D of the main body. In the illustrated fourth arrangement, each reinforcing body is parallel to its proximal peripheral face (as indicated by matching appended letters) and recessed therefrom. With such an arrangement, the main body 12 is reinforced with a body of reinforcing material carried at or adjacent each peripheral face. Furthermore, of the four reinforcing bodies in the illustrated fourth arrangement, each diametrically opposite pair thereof 16A, 16B and 16C, 16D is carried in the main body 12 in spaced parallel fashion relative to one another. Additionally, faces 18 of smaller-sized ones of the reinforcing material bodies 16C and 16D generally overlap the peripheral edges 17 of larger-sized ones of the reinforcing material bodies 16A and 16B, although an amount of foam material is disposed between the overlapped faces and peripheral edges.

Figure 7:
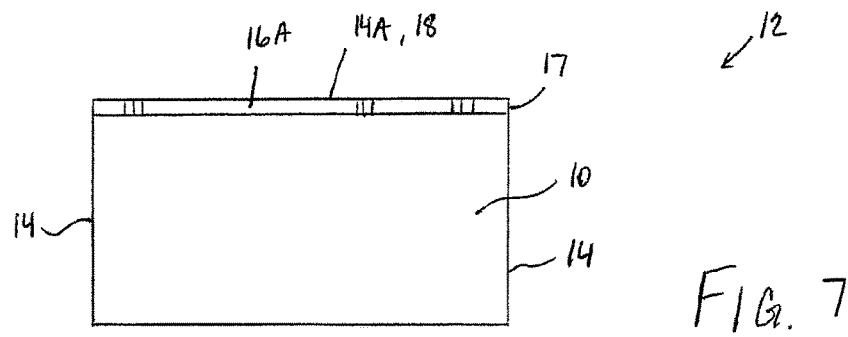
FIG. 7 is a cross-sectional view as if along line B-B but showing a fifth arrangement of reinforced foam block according to the present invention.

FIG. 7 more clearly shows a fifth arrangement of reinforced foam block in which the sheet body of reinforcing material 16A is located at one peripheral face 14A of the main body so as to define the full surface thereof and thus span the full predetermined surface area of this peripheral face. Furthermore, the sheet body's peripheral edge 17 is entirely exposed about its full periphery. As such, only one face of the sheet body is wholly covered by the foam material. Also, in the illustrated fifth arrangement, the body of reinforcing material comprises the body of permeable material (as schematically indicated in FIG. 7), such as the PVC mesh plastic, such that the foam material passes through a thickness of the permeable material body so as to hold same in the body of foam material 10. The foam material may pass through a partial thickness or through a full thickness of the sheet body of permeable material.

Figure 8:
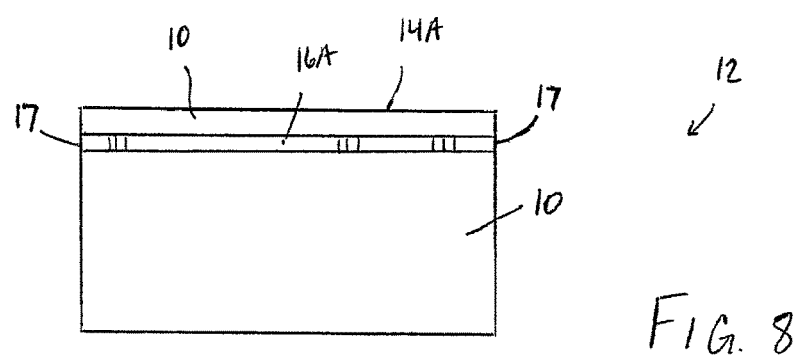
FIG. 8 is a cross-sectional view as if along line B-B but showing a sixth arrangement of reinforced foam block according to the present invention.

FIG. 8 more clearly illustrates a sixth arrangement of reinforced foam block in which the body of reinforcing material 16A is recessed from the proximal peripheral face 14A but the peripheral edge 17 of the reinforcing body is exposed so as to uncovered by any foam material. In this illustrated sixth arrangement, the body of reinforcing material comprises permeable material, such as that which is porous, such that the foam material passes through a thickness of the body of permeable reinforcing material so as to hold the reinforcing body within the main body.

Figure 9:
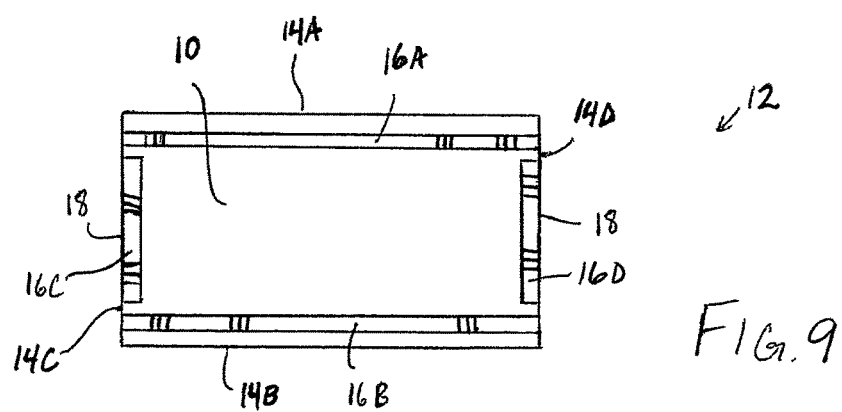
FIG. 9 is a cross-sectional view as if along line B-B but showing a seventh arrangement of reinforced foam block according to the present invention.

Turning now to FIG. 9, this figure more clearly shows a seventh arrangement of reinforced foam block in which a plurality of bodies of reinforcing material 16A through 16D are disposed. In this illustrated seventh arrangement, one diametrically opposite pair of the reinforcing bodies 16A, 16B are recessed from proximal peripheral faces 14A, 14B closest to which each one of this opposing pair is located, with their peripheral edges 17 exposed at peripheral faces 14C, 14D adjoining the respective proximal face 14A or 14B. Also, each one of a second diametrically opposite pair of the reinforcing material bodies 16C, 16D is located at the respective proximal peripheral face 14C or 14D so as to define its surface and thus have a wholly uncovered, exposed face 18 of the respective body of reinforcing material.

Figure 10:
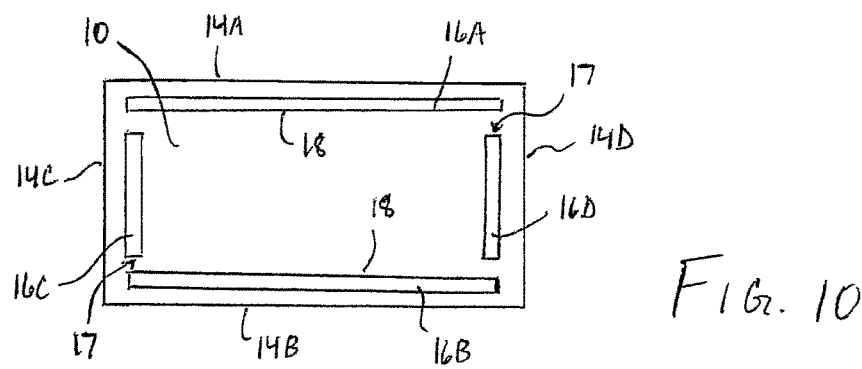
FIG. 10 is a cross-sectional view as if along line B-B but showing an eighth arrangement of reinforced foam block according to the present invention.
Figure 11:
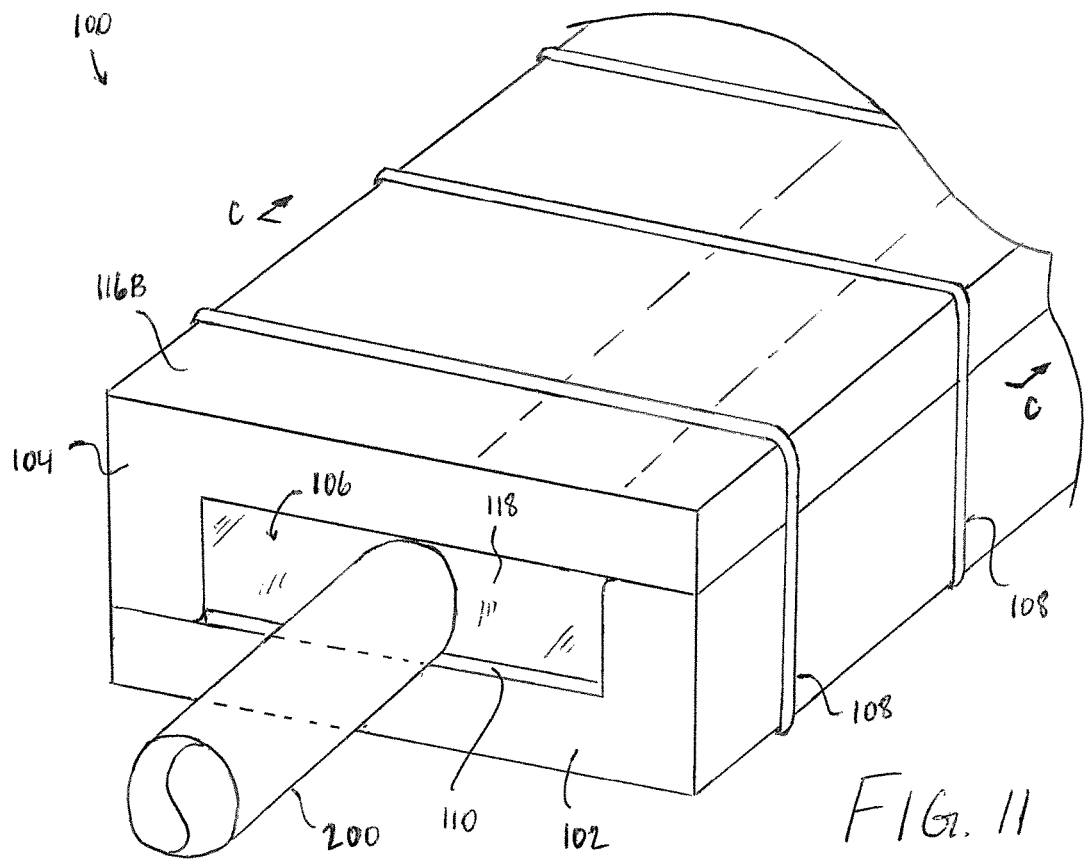
FIG. 11 is a perspective view of one arrangement of encapsulation kit.

In FIG. 10, an eighth arrangement of reinforced foam block is shown, in which a plurality of bodies of reinforcing material 16A through 16D are provided and each of these is recessed from a proximal peripheral face 14A through 14D closest to the respective reinforcing body so as to be fully covered, on all faces and peripheral edges, by the foam material. In contrast to FIG. 6, faces 18 of larger-sized ones of the reinforcing material bodies 16A and 16B generally overlap the peripheral edges 17 of smaller-sized ones of the reinforcing material bodies 16C and 16D, though an amount of foam material is disposed between the overlapped faces and peripheral edges.

Note that in the illustrated arrangements, each body of reinforcing material is sized such that its prescribed surface area, which is formed by one face of the reinforcing material body that is generally parallel to and facing (from the inside of the main body) a proximal peripheral face of the main body, is on the order of the predetermined surface area of the proximal peripheral face.

In other embodiments, multiple bodies of reinforcing material may be carried at a common peripheral face such that their collective surface area is on the order of the surface area of the proximal peripheral face. These multiple bodies of reinforcing material may be arranged in butting engagement with one another, or alternatively the multiple bodies of reinforcing material are spaced apart from one another so as to be separated by an amount of foam material between an adjacent pair of the reinforcing bodies carried at the common peripheral face.

In order to manufacture the reinforced foam block, the respective body of reinforcing material is disposed in a prescribed position in a chamber with an open top and closed bottom and held in place by a securing arrangement therein. A covering closes the open top of the chamber, and collectively the chamber and covering form a mold providing the shape of the main body 12. The foam material 10 is injected in liquid form through one of the covering and a chamber wall. The foam material then expands in the closed chamber so as to fill a remaining space in the mold which is unoccupied by the respective body of reinforcing material placed therein. Depending on the type of material employed for the reinforcing body, the foam material may pass through a thickness of the reinforcing body as the foam material expands thereby infusing the reinforcing material with the foam material. In the manner described in this paragraph, the respective body of reinforcing material is embedded in the main body and carried in its prescribed position in the main body by the foam material.

Referring to FIGS. 11 through 20, there is illustrated a kit for encapsulating a length of pipe 200 that is generally indicated by reference numeral 100. The kit for encapsulating the length of pipe is referred to as a 'pipe encapsulation kit' hereinafter in the description for convenience. The reinforced foam block may be suited for use in this encapsulation kit, as will become apparent with further description of this particular example in more detail hereinafter.

The pipe encapsulation kit 100 is suited for protecting piping which is disposed underground so as to reside in a subterranean environment. The piping or pipe may extend along an underground grade, that is at an elevation below the ground surface, such that the length of pipe is oriented substantially horizontally in the ground. The pipe 1 may also be oriented uprightly in the ground at riser sections of the pipeline where the piping traverses several underground grades in order to arrive at or extend away from equipment located at or near the ground surface. Furthermore, the length of pipe may follow a straight line path, a curved path at a bend section of the pipeline, or a serpentine like path with several curves in the path of the piping.

Underground, a length of pipe which is exposed to its external subterranean surroundings may be subject to stress from abrasive debris and contents in the ground, such as rocks, which directly engage the pipe and generate pressure points on the pipe surface. With prolonged stress and pressure points, which are exacerbated by movement of the pipeline such as due to thermal expansion and contraction thereof, longevity of the pipe decreases and likelihood of the pipe rupturing increases. Pipe ruptures and consequent leakage of the fluids carried by the pipeline can be costly for the pipeline operator and for the environment.

Figure 12:
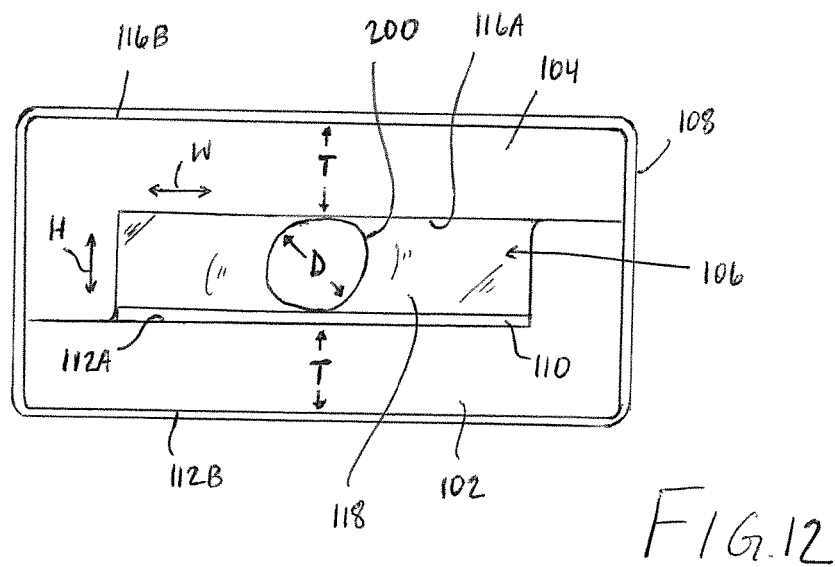
FIG. 12 is a cross-sectional view along line C-C in FIG. 11.

In order to shield the piping from the abrasive contents in the ground, the pipe encapsulation kit 100 comprises first and second foam sections 102 and 104. Each of the first and second foam sections extend in a respective longitudinal axis along the length of pipe 200 in a manner so as to be suited for covering a longitudinal length of the pipe. The two foam sections are shaped to cooperatively form a longitudinally elongate cavity 106 in a working configuration of the foam sections as more clearly shown in FIG. 11. That is, each foam section is shaped in transverse cross-section across its width so that, when the foam sections are disposed in the working configuration, the foam sections cooperate to form the cavity for receiving the length of pipe therein so as to enclose the length of pipe around its full circumference thereby shielding the length of pipe 200 from the subterranean environment. The cavity 106 formed in the working configuration spans a full longitudinal length of the foam sections 102, 104 and has open ends so that the pipe is receivable in the cavity. Additionally, the cavity has a height dimension and a width dimension which are measured transversely to one another and to the longitudinal axis. The height and width of the cavity are sized at least equal to a pre-specified diameter of the pipe 'D' which is encapsulated. In FIG. 12, double-headed arrows indicated at 'H' and 'W' illustrate general directions in which the height and the width of the cavity are measured respectively.

In the illustrated arrangements of FIGS. 11 through 16, each foam section is generally L-shaped in transverse cross-section so as to have a long leg and a short leg. Thus, the L-shaped foam sections arranged in the working configuration form a cavity having a rectangular cross-section with the long legs of each of the foam sections disposed opposite one another and the short legs disposed opposite one another. Furthermore, the foam material which makes up these foam sections 102, 104 can be considered to be 'high density foam' as will become apparent shortly.

Generally speaking, in the working configuration, one of the foam sections (for example that indicated at 102) defines a bottom covering usable for positioning at the bottom of the pipe circumference and another one of the foam sections (for example that indicated at 104) defines a top covering usable for positioning at the top of the pipe circumference. 'Bottom' and 'top' typically refer to opposite locations with respect to the circumference of the pipe. Thus, when the length of pipe is generally horizontally oriented, the bottom covering is positioned beneath the length of pipe 200 and the top covering is positioned over the length of pipe. However, if the length of pipe is oriented uprightly, the bottom covering may not necessarily be lower than the top covering. Furthermore, each foam section may define one of the top covering and the bottom covering such that the top and bottom coverings are individual pieces, like the arrangements illustrated in FIGS. 11 through 20. For example, the L-shaped foam sections in the illustrated embodiment are disposed one on top of the other so that there is provided a first bottom foam section and a second top foam section. In other embodiments, a single foam section may define both the top and bottom coverings. For example, in an alternative embodiment, one of the foam sections may be generally C-shaped in cross-section and a second one of the foam sections may define an insert which is received between parallel branches of the C-shaped foam section so as to form the cavity in the working configuration.

Thus, the first and second foam sections 102 and 104 form an outer protective covering which shields the length of pipe from the external underground environment—in other words, the external subterranean environment.

A securing arrangement 108 is provided to hold the first and second foam sections 102, 104 together in the working configuration. In the illustrated arrangements of FIGS. 11 through 20, the securing arrangement 108 comprises a plurality of bands which ring around an outside of the foam sections about their transverse perimeter thereby snugly holding the foam sections together with one another in the working configuration.

Furthermore, in the illustrated arrangements of the encapsulation kit, an inner reinforcing membrane 110 is carried at or adjacent a respective inside face 112A of the bottom covering so as to be arranged to line a portion of the cavity 106. That is, the inner reinforcing membrane 110 lies along a boundary of the cavity. As such, the inner reinforcing membrane may be exposed to the cavity so as to directly engage a circumferential outer surface of the pipe 200, as more clearly shown in FIG. 12. Alternatively, the inner reinforcing membrane may be covered by a thickness of foam material over the inner reinforcing membrane's surface area so as to be spaced from the inside face 112A of the bottom covering but located closer to this inside face than to an opposite outside face 112B of the bottom covering. In either case, the inner reinforcing membrane comprises a body of material which has greater tensile strength than a material of the first and second foam sections so as to provide strength for the bottom covering. The inner reinforcing membrane 110 may dissipate at least a portion of the weight of the pipe and may act to hold the foam material of the bottom covering together without the foam material fragmenting under weight of the length of pipe 200.

Figure 13:
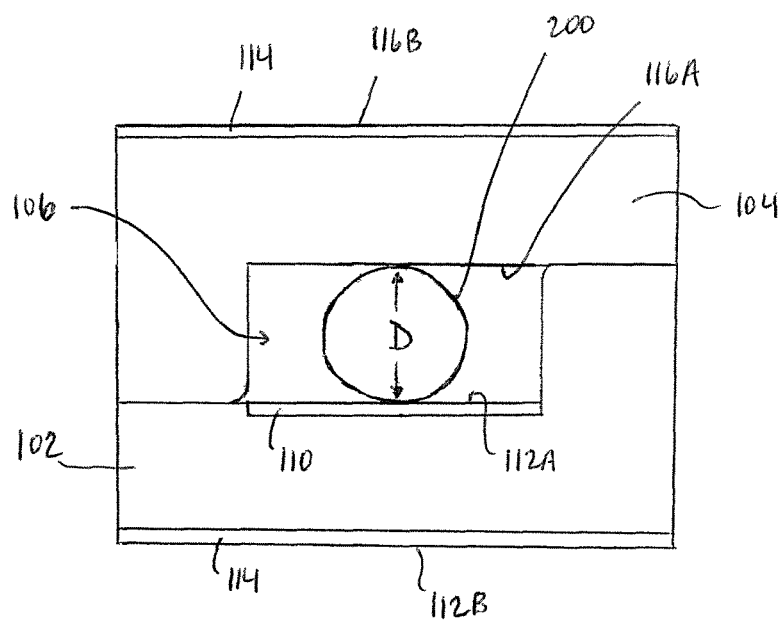
FIG. 13 is a cross-sectional view of another arrangement of encapsulation kit as if the cross-section were taken along line C-C and omitting some features for clarity of illustration.
Figure 14:
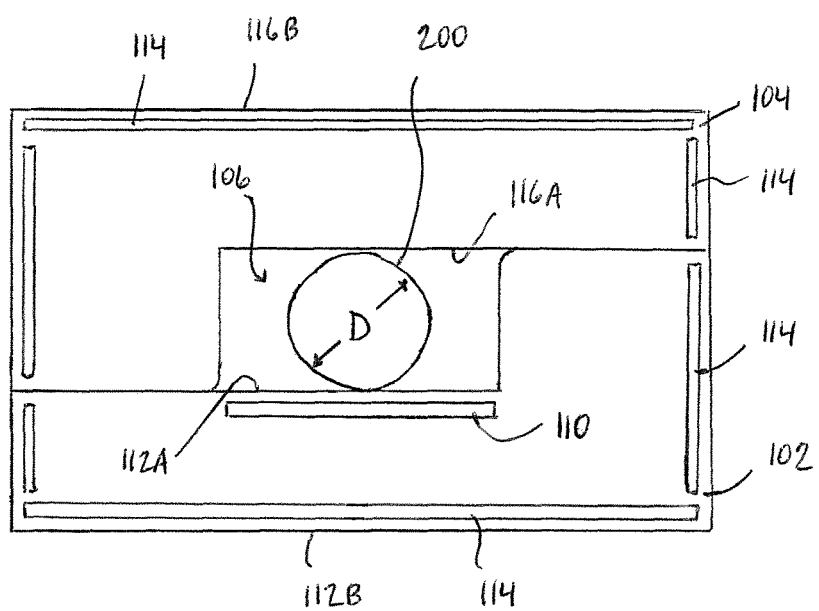
FIG. 14 is a cross-sectional view of yet another arrangement of encapsulation kit as if the cross-section were taken along line C-C and omitting some features for clarity of illustration.

At least one outer reinforcing membrane 114 may also be provided as more clearly shown in FIGS. 13 and 14. The outer reinforcing membrane 114 is carried at or adjacent a respective outside face 112B, 116B of at least one of the first and second foam sections, with the outside face being exposable to the subterranean environment. In the illustrated arrangements of the encapsulation kit, the outer reinforcing membranes 114 are located at or adjacent the outside face which is opposite to the inside face 112A, 116A of the respective foam section 102, 104. The outer reinforcing membrane may be located at the outside face so as to define its surface as for example shown in FIG. 13. Alternatively, the outer reinforcing membrane may be fully enveloped by foam material within a main body of the respective foam section as more clearly shown in FIG. 14. Similar to the inner reinforcing membranes, the outer reinforcing membranes provide strength for an outward facing shell of the foam sections. The outer reinforcing membrane comprises a body of material which has greater material hardness than the material of the foam sections. Therefore, the material of the outer reinforcing membrane may also be more resistant to pressure than the foam material of the foam sections. Thus, punctures through a full thickness of the foam sections due to sharp debris in the ground may be prevented. Furthermore, the outer reinforcing membranes may dissipate at least a portion of the weight of the subterranean environment exerting compressive forces on the foam sections, and may hold the foam material together under compressive forces of the subterranean environment on the foam sections in the working configuration.

Additionally, a volume of low density foam 118 is provided for filling any unoccupied space in the cavity 106 once the pipe 200 is received therein. The low density foam 118 is less dense than the material of the first and second foam sections 102, 104 so as to cushion the length of pipe 200 in a manner in which stress is reduced. That is, pressure from pressure points exerted directly on the outer foam section and transmitted therethrough may be dissipated by the low density foam. Therefore, as mentioned before, the material of the first and second foam sections may be considered to be high density relative to the low density foam 118. Furthermore, this lower density of the low density foam with respect to the foam sections allows a degree of movement of the length of pipe within the cavity while reducing stress on the pipe that is generated internally within the encapsulation kit by this movement.

Returning now to the components of the pipe encapsulation kit in more detail, and turning first to the foam sections, the foam sections 102 and 104 are made from an insulating material so as to provide thermal insulation for the piping. For example, the foam sections are made of polyurethane foam which has thermal insulating properties. The polyurethane foam is injected into molds thereby producing the appropriately shaped foam sections.

Figure 15:
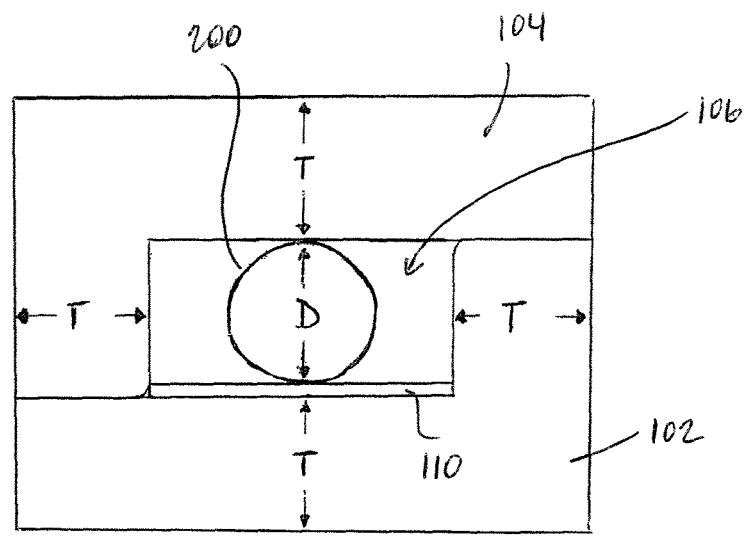
FIG. 15 is a cross-sectional view of a further arrangement of encapsulation kit as if it were taken along line C-C and omitting some features for clarity of illustration.
Figure 16:
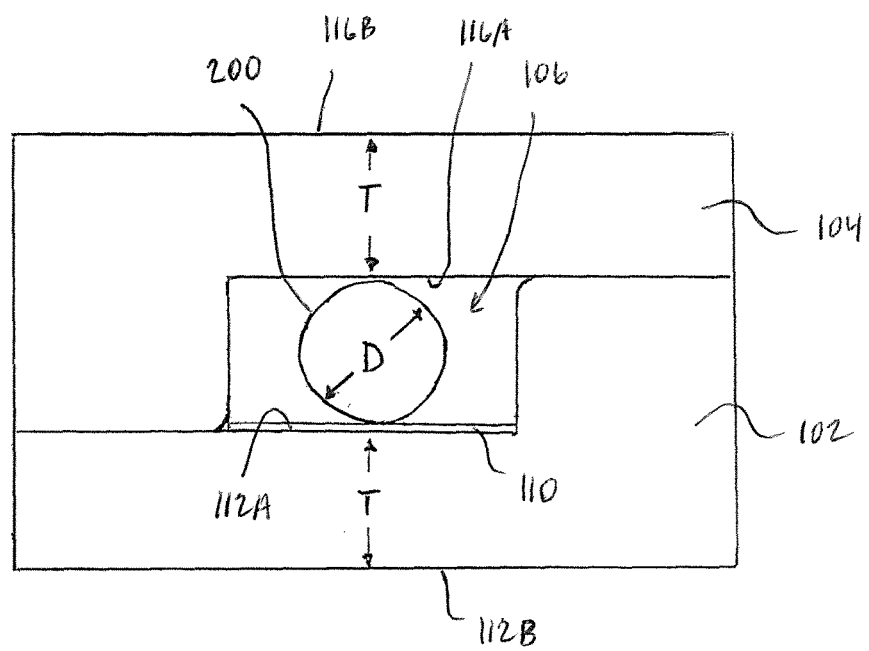
FIG. 16 is a cross-sectional view of a yet further arrangement of encapsulation kit as if the cross-section were taken along line C-C and omitting some features for clarity of illustration.

The first and second foam sections 102 and 104 have a predetermined thickness 'T' where thickness is measured transversely with respect to the longitudinal axis of the foam sections and thus generally radially with respect to a center of the cavity 106 as better shown in FIGS. 15 and 16. More particularly, it is the top covering and bottom coverings (irrespective of the specific configurations of foam sections) which have the predetermined thickness of foam material as measured between an outer face 112B or 116B of the respective covering and an opposite inside face thereof 112A or 116A that defines a wall of the cavity in the working configuration of the foam sections. This predetermined thickness T is on the order of the pre-specified diameter D of the pipe 200 which is to be encapsulated. For example, the predetermined thickness T may be equal to the pre-specified diameter D. As such, the predetermined thickness T may lie in a first prescribed range of 1 to 40 inches. The predetermined thickness T may alternatively lie in a second prescribed range of 1.5 to 38 inches and provide similar functionality to that of the first prescribed range. Moreover, the predetermined thickness T may alternatively lie in a third prescribed range of 2 to 36 inches and provide similar functionality to that of the first and second prescribed ranges. Values of the prescribed ranges for the predetermined thickness correspond to typical diameter values of the piping used in pipelines. As more clearly shown in FIG. 15, the foam sections may also have the pre-determined thickness T of foam material between each one of outside faces, which lie to one side of the walls of the cavity which define the width W thereof, and the respective one of these walls.

The foam sections 102, 104 are also sized in order to provide a sufficiently large cavity 106. Typically, the width W of the cavity is sized larger than the height H of the cavity as shown in the illustrated arrangements. That is, in the illustrated embodiment, the width W is taken between cavity walls formed by the short legs of the foam sections and the height H is taken between cavity walls formed by the long legs of the foam sections. Thus, the width W of the cavity is sized on the order of at least twice the pre-specified diameter D of the length of the pipe. For example, the width W is equal to twice the pre-specified diameter D. Thus, sufficient room may be provided in the cavity 106 for the low density foam 118 to reside therein such that the length of the pipe is adequately cushioned. The height H of the cavity is sized on the order of the pre-specified diameter D of the pipe, such as slightly larger than the pre-specified diameter D, so that the length of pipe 200 is provided with some room to shift or expand in its size across the height dimension H of the cavity.

Turning now to the inner reinforcing membrane 110, the inner reinforcing membrane of the illustrated arrangements more clearly shown in FIG. 12 which is exposed to the cavity 106 comprises a body of antifriction material so that friction between the inner reinforcing membrane and the length of pipe 200 is reduced, such as the friction generated by movement of the pipe along or across the inner reinforcing membrane. This reduction in friction is intended to reduce pressure and stress on the length of pipe. For example, the antifriction material comprises a sheet of polyethylene plank foam, which is sold under the trade name Ethafoam, forming a mat on the inside face of the bottom covering. In another example, PVC plastic, such as rock shield which forms a mesh sheet, may be suited for use as the antifriction inner reinforcing membrane. In a further example, a body of rubber material, such as stranded rubber, forming a mat on the inside face of the bottom covering comprises the antifriction inner reinforcing membrane.

In the illustrated arrangements as more clearly shown in FIGS. 12 through 16, the inner reinforcing membrane 110 spans the full length and the full width of the cavity 106 so as to be rectangular in shape. Furthermore, the inner reinforcing membrane is centrally located with respect to the full width of the first bottom foam section 102 where the membrane is carried. The inner reinforcing membrane may be embedded in the foam section so as to be enveloped by the foam material of the foam section or infused therewith.

Alternatively, the inner reinforcing membrane may be attached to the foam material of the respective foam section by an adhesive, for example a suitable glue. In the instance that the inner reinforcing membrane is located at the inside face of the bottom covering so as to define the surface thereof, the inner reinforcing membrane may be considered to be a sacrificial layer or membrane which directly engages the outer surface of the pipe.

Turning now to the outer reinforcing membrane 114, the outer reinforcing membrane may be embedded in the foam section so as to be enveloped by the foam material of the foam section or infused therewith. Alternatively, the outer reinforcing membrane may be attached to the foam material by a suitable adhesive. Furthermore, the outer reinforcing membranes may be placed at a plurality of the outside (outward facing) faces of the foam sections which are exposable to the external subterranean environment, as more clearly shown in FIG. 14.

Now turning to the low density foam 118, the low density foam resides in all of the unoccupied space in the cavity which is between the cavity walls and the pipe. In the illustrated embodiment, the low density foam 118 primarily resides to either side of the length of the pipe. As such, the low density foam snugly sandwiches the length of pipe 200 within the cavity 106 between the foam sections, with the provision of movement as discussed hereinbefore. Preferably, as shown more clearly in FIG. 12, the pipe is positioned within the cavity so as to be spaced from opposing sides of the cavity defining the width W thereof such that the volume of the low density foam is disposed across the full height H of the cavity on either side of the length of the pipe 200 so that a thickness of low density is provided around a full circumference of the pipe with the exception of where the pipe engages the inner reinforcing membrane 110. In this manner, side-to-side movement of the pipe within the cavity 106 may be sufficiently cushioned. The low density foam may comprise a material such as spray foam or a combination of spray foam and polyethylene plank foam sold under the trade name Ethafoam. Furthermore, the low density foam may be sprayed so as to fill the cavity.

According to the above description, the foam sections 102, 104 and reinforcing membranes 110, 114 and low density foam 118 collectively form a cocoon-like structure which envelops and encapsulates the length of pipe so as to preserve same. In other words, the aforementioned components form a shielding enclosure in the working configuration for the length of pipe 200. The pipe encapsulation kit 100 is suited for preventing pressure on the length of pipe, providing thermal insulation, cushioning expansion of the pipe, and thereby increasing longevity of the length of pipe and reducing possibility of failure thereof and blowouts.

A length value of the pipe that may be protected by the shielding enclosure comprising a pair of the foam sections depends on the individual lengths of the foam sections. Typically, both the first bottom and second top foam sections are identical in construction so as to have a common overall dimensions.

Figure 17:
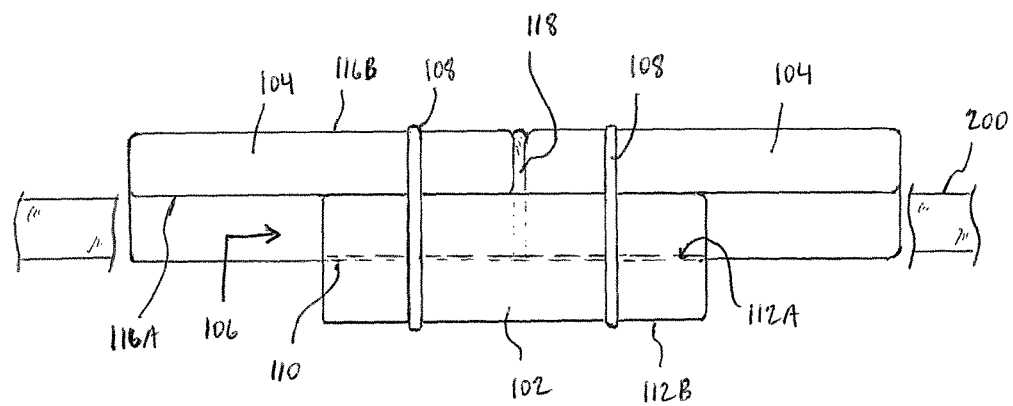
FIG. 17 is a side elevational view of a further arrangement of the encapsulation kit of FIG. 1 showing how more than two foam sections may be arranged together.
Figure 18:
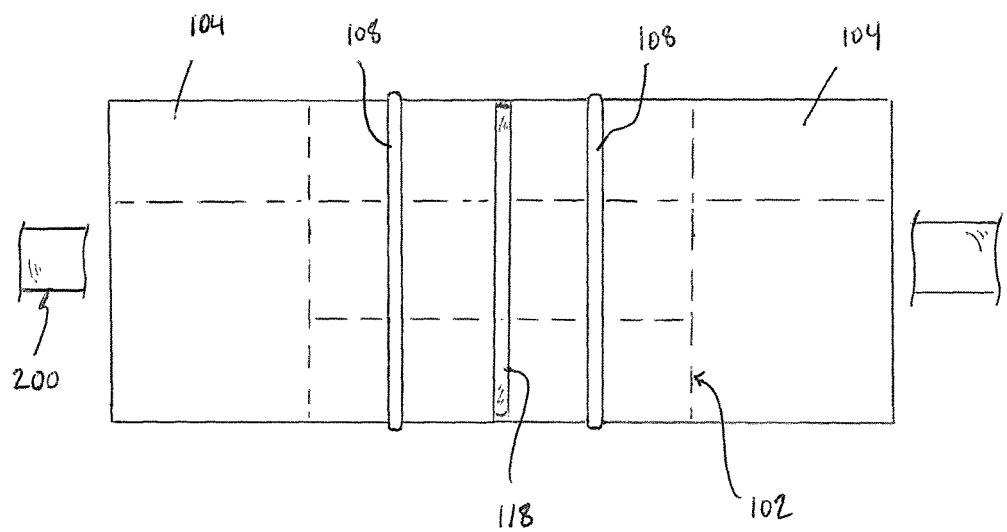
FIG. 18 is a top plan view of the arrangement of FIG. 17.

Depending on the application, different arrangements of the shielding enclosure may be employed. In one arrangement, a plurality of shielding enclosures can be installed at spaced intervals along the length of the pipeline so as to protect separate length portions of the pipe. For example, each of these shielding enclosures comprises the pair of foam sections aligned with one another along their lengths. In another arrangement, like that shown in FIGS. 17 and 18, a continuous uninterrupted length of pipe may be protected by arranging more than two foam sections end-to-end. In this particular arrangement for protecting the continuous uninterrupted length of the pipe, the first bottom foam sections (only one is shown in FIGS. 17 and 18) are disposed end-to-end to a common bottom side of the pipe and the second top foam sections are disposed to a common top side of the pipe in a similar manner as the bottom foam sections. Each pair of one first foam section and second foam section, which are opposite one another and collectively circumferentially enveloping a length portion of the pipe, are held together by the securing arrangement 108 such as the bands discussed hereinbefore. The first and second foam sections are offset from one another in a lengthwise direction along the longitudinal axis so as to present a portion of an inside face thereof 112A, 116A respectively for overlapping by another one of the opposite one of the first and second foam sections, so a majority of the respective foam sections are secured or banded to two of the oppositely designated foam section. Further to this, respective junction ends of each pair of adjacent first foam sections and each pair of adjacent second foam sections are filled with the low density foam 118 to afford shifting of one of said at least two foam sections relative to the other.

Figure 19:
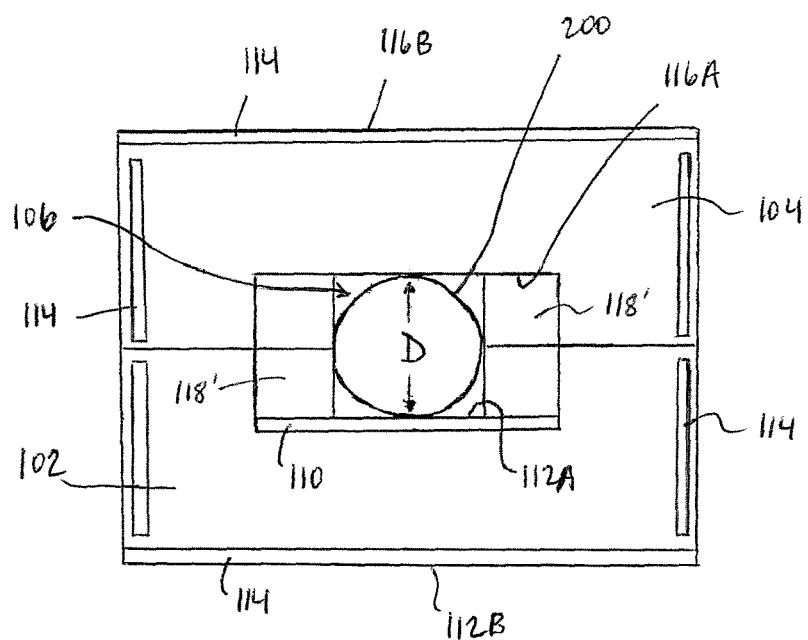
FIG. 19 is a cross-sectional view of another arrangement of encapsulation kit as if it were taken along line C-C and omitting some features for clarity of illustration.

FIG. 19 shows another arrangement of encapsulation kit according to the present invention in which each one of the foam sections 102, 104 is generally U-shaped so as to have two, transversely opposite short legs which are connected by a base spanning perpendicularly therebetween. Also, a volume of low density foam in the form of a pair of pads 118' is disposed to either side of the length of pipe 200 in the cavity 106 such that a majority but not all of the cavity is occupied by the low density foam. Each pad 118' covers an inside face of the respective short leg of the U-shaped foam section and a portion of the inside face 116A of the base. The respective pad 118' is attached to at least one of the short leg and the base of the U-shaped foam section such as by a suitable adhesive. Furthermore, each pad 118' is sized, for example by having a thickness, such that the unoccupied space as measured in a direction along the width W of the cavity is sized on the order of the diameter D of the length of pipe 200.

Figure 20:
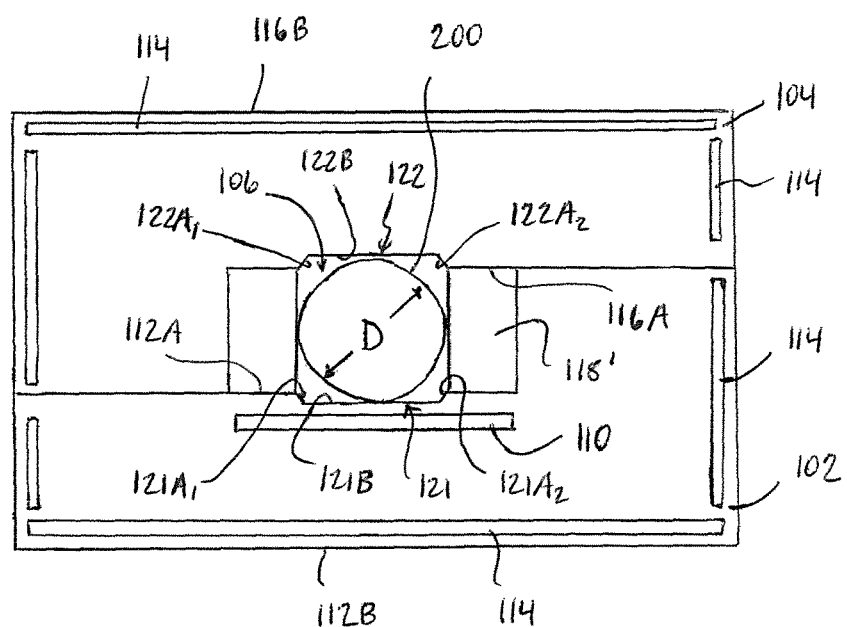
FIG. 20 is a cross-sectional view of yet another arrangement of encapsulation kit as if it were taken along line C-C and omitting some features for clarity of illustration.

FIG. 20 shows yet another arrangement of encapsulation kit in which each of the foam sections 102, 104 includes a groove or depression 121, 122 in the inside face 112A, 116A of the respective foam section. The depression spans the full length of the respective foam sections and locates the length of pipe 200 in the cavity 106. Thus, the depression may be suited for reducing rolling movement during installation of the length of pipe across the respective inside face of the foam section that defines the bottom covering. As such, the cavity as measured between opposing depressions 121, 122 which are positioned diametrically opposite one another in the working configuration of the foam sections is sized on the order of the diameter D of the length of pipe 200, while the cavity between remaining portions of the inside faces 112A and 116A that are outside of the groove 121, 122 in the cavity provide a height which is less than the diameter D of the length of pipe. Also, in the illustrated arrangement each depression is formed by a series of planar surfaces, each contiguous with the next. Each depression 121, 122 comprises transversely opposite side portions $121A_1/122A_1$ and $121A_2/122A_2$, which are inclined so as that the depression tapers inwardly from its outermost sides, and a flat main portion 121B/122B which spans between the side portions. Additionally, the low density foam pads 118' are disposed to either side of the length of pipe 200 and span a full height of the cavity between the remaining portions of the inside faces 112A and 116A alongside the depressions 121 and 122.

It is therefore appreciated that the reinforced foam blocks are suited for use in the encapsulation kit 100 for one or both of the foam sections. The reinforced foam blocks provide their respective bodies of reinforcing material 16 at strategic locations within the body of foam material 10 for strengthening the main body 12 of the foam block, thus providing a cushion which may be able to withstand significant compressive forces such as due to resting pipes down upon these blocks. The bodies of reinforcing material are also materially harder than the foam material, thereby being better suited for resisting punctures than the foam material.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A kit for encapsulating a length of pipe in a subterranean environment comprising:
   a prefabricated upper foam section and a prefabricated lower foam section assemblable in a working configuration of the kit in which the upper foam section is supported by the lower foam section disposed thereunder;
   each of the lower and upper foam sections having a pipe-facing portion of an outer peripheral surface thereof which is shaped to define a portion of a substantially circumferentially enclosed cavity cooperatively formed by the upper and lower foam sections when assembled in the working configuration, in which with the pipe-facing portion of the peripheral surface of a respective one of the upper and lower foam sections is facing the pipe-facing portion of the peripheral surface of the other for receiving the length of pipe in the cavity;
   a securing arrangement for maintaining the upper and lower foam sections in the working configuration in which the upper and lower foam sections cooperatively form the cavity;
   a volume of low density foam which is less dense than a material of either one of the upper and lower foam sections for filling unoccupied space in the cavity between the length of pipe and the inside face of each of the upper and lower foam sections to enable the length of pipe to move transversely while providing cushioning therefor.

2. The kit for encapsulating the length of pipe according to claim 1 wherein the lower foam section includes a reinforcing membrane comprising a material which is more resistant to pressure before incurring permanent shape change than the material of the lower foam section that is carried by the lower foam section at or adjacent the pipe-facing portion of the outer peripheral surface thereof.

3. The kit for encapsulating the length of pipe according to claim 2 wherein the reinforcing membrane comprises a body of polyethylene plank foam forming a mat on the pipe-facing portion of the outer peripheral surface of the lower foam section.

4. The kit for encapsulating the length of pipe according to claim 2 wherein the reinforcing membrane comprises a body of rubber material forming a mat at the pipe-facing portion of the outer peripheral surface of the lower foam section.

5. The kit for encapsulating the length of pipe according to claim 2 wherein the reinforcing membrane comprises a body of plastic forming a sheet located at or adjacent the pipe-facing portion of the outer peripheral surface of the lower foam section.

6. The kit for encapsulating the length of pipe according to claim 5 wherein the body of plastic is embedded in the lower foam section.

7. The kit for encapsulating the length of pipe according to claim 1 wherein the lower foam section includes an antifriction material carried at the pipe-facing portion of the outer peripheral portion thereof.

8. The kit for encapsulating the length of pipe according to claim 1 wherein at least one of the upper and lower foam sections includes a reinforcing membrane which comprises a material more resistant to pressure before incurring permanent shape change than a material of the respective one of said at least one of the upper and lower foam sections, the reinforcing membrane being carried at or adjacent a portion of an outer peripheral surface that is exposable to the subterranean environment in the working configuration.

9. The kit for encapsulating the length of pipe according to claim 8 wherein the reinforcing membrane is embedded in the respective one of said at least one of the upper and lower foam sections in a manner so as to be located at or adjacent said portion of the outer peripheral surface exposable to the subterranean environment.

10. The kit for encapsulating the length of pipe according to claim 1 wherein at least one of the upper and lower foam sections includes a depression defined at in the pipe-facing portion of the outer peripheral surface thereof for locating the length of pipe in the cavity in the working configuration of the kit.

11. The kit for encapsulating the length of pipe according to claim 1, in combination with the length of pipe having a pre-specified diameter, wherein the cavity formed in the working configuration of the kit has a height and a width which are measured transversely to one another and to an axis of the length of pipe each sized at least equal to the pre-specified diameter of the pipe.

12. The kit for encapsulating the length of pipe according to claim 11 wherein the width of the cavity in the working configuration is sized in the order of at least twice the pre-specified diameter of the length of the pipe.

13. The kit for encapsulating the length of pipe according to claim 11 wherein each of the upper and lower foam sections has a predetermined thickness as measured along the height of the cavity that is in the order of the pre-specified diameter of the length of the pipe.

14. The kit for encapsulating the length of pipe according to claim 1 wherein there is provided at least two of one of the upper and lower foam sections disposed end-to-end in the working configuration, a junction between ends of said at least two of said one of the upper and lower foam sections that are facing each other being filled with the low density foam to enable shifting between said at least two of said one of the upper and lower foam sections relative to each other.

15. The kit for encapsulating the length of pipe according to claim 1 wherein the upper and lower foam sections assembled in the working configuration are offset from each other in a direction arranged parallel to the length of pipe so as to presented for overlapping by another opposite one of the upper and lower foam sections.

16. The kit for encapsulating the length of pipe according to claim 1 wherein the upper and lower foam sections each are generally L-shaped in transverse cross-section so as to have a long leg and a short leg.

17. The kit for encapsulating the length of pipe according to claim 16 wherein, in the working configuration, the long legs of the upper and lower foam sections are disposed parallel to a width of the cavity which is measured between the short legs of the upper and lower foam such that the width of the cavity is larger than a height of the cavity which is measured between the long legs of the upper and lower foam sections.

* * * * *